US005315695A

United States Patent [19]

Saito et al.

[11] Patent Number: 5,315,695

[45] Date of Patent: May 24, 1994

[54] PERSONAL COMPUTER CAPABLE OF ALTERING DISPLAY LUMINANCE THROUGH KEY OPERATION

[75] Inventors: Toshimitsu Saito; Mayumi Oka; Atsuhiro Ootake; James Mason, all of Tokyo, Japan

[73] Assignee: Kabushiki Kaisha Toshiba, Kawasaki, Japan

[21] Appl. No.: 718,408

[22] Filed: Jun. 24, 1991

[30] Foreign Application Priority Data

Jun. 25, 1990 [JP] Japan .................................. 2-166323

[51] Int. Cl.5 ............................................ G06F 15/62

[52] U.S. Cl. .................................... 395/132; 364/707; 345/12; 345/63; 345/77

[58] Field of Search ............... 395/131, 132, 162, 750, 395/800; 340/703; 364/707; 345/12, 63, 77

[56] References Cited

U.S. PATENT DOCUMENTS 4,952,917 8/1990 Yabuuchi ............................ 340/703
4,984,185 1/1991 Saito .................................... 364/707

FOREIGN PATENT DOCUMENTS

0209836A1 1/1987 European Pat. Off. ...... G09G 3/36
0404182A1 12/1990 European Pat. Off. ...... G09G 5/00

*Primary Examiner*—Heather R. Herndon
*Assistant Examiner*—Almis Jankus
*Attorney, Agent, or Firm*—Finnegan, Henderson, Farabow, Garrett & Dunner

[57] ABSTRACT

A battery operable personal computer comprises a display, a keyboard, a CPU, and a power supply circuit. The display panel displays various types of data at a luminance level according to a value of a luminance control signal. The keyboard serves to enter data instructing alteration of the luminance level of the display unit. The CPU instructs the luminance level of the display unit in accordance with data entered through the keyboard, The power supply circuit controls the value of the luminance control signal to be supplied to the display unit in such a way that the luminance level of the display becomes one specified by the CPU.

10 Claims, 8 Drawing Sheets

M-TBL60

| LUMINANCE LEVEL | SUPPLY CURRENT LEVEL |
|---|---|
| 0 | 0 |
| 1 | 50 |
| 2 | 60 |
| 3 | 70 |
| 4 | 80 |
| 5 | 90 |
| 6 | 100(MAX) |

LOW BATTERY

1 → S-TBL1 61

| REMAINING CAPACITANCE | SUPPLY CURRENT LEVEL |
|---|---|
| 40 | 50 |
| 30 | 50 |
| 20 | 50 |
| 10 | 10 |

2 → S-TBL2 62

| REMAINING CAPACITANCE | SUPPLY CURRENT LEVEL |
|---|---|
| 40 | 60 |
| 30 | 60 |
| 20 | 60 |
| 10 | 10 |

3 → S-TBL3 63

| REMAINING CAPACITANCE | SUPPLY CURRENT LEVEL |
|---|---|
| 40 | 70 |
| 30 | 50 |
| 20 | 30 |
| 10 | 10 |

4 → S-TBL4 64

| REMAINING CAPACITANCE | SUPPLY CURRENT LEVEL |
|---|---|
| 40 | 80 |
| 30 | 80 |
| 20 | 80 |
| 10 | 10 |

5 → S-TBL5 65

| REMAINING CAPACITANCE | SUPPLY CURRENT LEVEL |
|---|---|
| 40 | 90 |
| 30 | 90 |
| 20 | 90 |
| 10 | 10 |

6 → S-TBL6 66

| REMAINING CAPACITANCE | SUPPLY CURRENT LEVEL |
|---|---|
| 40 | 100 |
| 30 | 100 |
| 20 | 100 |
| 10 | 10 |

FIG. 5

PERSONAL COMPUTER CAPABLE OF ALTERING DISPLAY LUMINANCE THROUGH KEY OPERATION

BACKGROUND OF THE INVENTION

1. Field of the Invention

The present invention relates to a personal computer with a flat panel display and more specifically, to a battery operable personal computer.

2. Description of the Related Art

Various kinds of so-called laptop personal computers are recently being developed as portable personal computers. A specific laptop computer has a flat panel display, such as a liquid crystal display. The liquid crystal display is hinged to its computer body to swing from a closed position to an open position or vise versa. The liquid crystal display covers a keyboard which is built in its computer body when it is closed. Accordingly the computer is more easily carried around. The flat panel display, such as the liquid crystal display, is preferable for a laptop personal computer to improve the portability of the computer.

The laptop personal computer includes a battery so that it can be operated at any places, even where the commercially-available power supply is not provided. When the battery is almost discharged, an operator removes the battery from the computer body, and can charge the battery again, or replace it with a new one. While charging or replacing the battery, the operator has to use the commercially-available power supply to operate the laptop computer.

Recently, various means have been developed to prolong the service life of a battery. One of these means is to control a display luminance to reduce the power consumption of a display.

Generally, energy is converted in the form of luminance to provide a data display. The power consumption varies according to the luminance level.

For example, the display luminance rises as the electric power of a light source increases in a liquid crystal display using, as a light source, a back light that illuminates the display from the back by a plane luminophor, such as an electroluminescence (EL) panel, or a side light that illuminates the display from the side by a cold-cathode tube (fluorescent (FL) tube). In a plasma display, as electric discharge in the panel, i.e., power consumption by discharge, increases, the display luminance rises.

As described above, the power consumption varies in accordance with the luminance level of the display. Conventionally, therefore, the luminance is automatically varied between when the computer is driven by the battery and when it is driven by the commercially-available power supply; the luminance has a lower value during the battery-operated period than during the period in which the commercially-available power supply is used. The power consumption in the battery-operated period can be reduced in this manner, thereby prolonging the service life of the battery.

The luminance is, however, fixed to a given low level during the battery-operated period. The display luminance may appear too low for some operators that it is difficult for the operators to see the display screen. Or, some other operators may wish to set the display luminance lower to prolong the life of the battery.

SUMMARY OF THE INVENTION

It is therefore an object of the present invention to provide a personal computer which permits a display luminance to be easily altered to the desired level according to an operator's instruction.

According to one aspect of the present invention, there is provided a battery operable personal computer comprising a display for displaying various types of data with luminance according to a value of a luminance control signal; a keyboard for entering data indicating a change in the luminance on the display; an instructing section for instructing a value of the luminance of the display in accordance with the data received from the keyboard; a luminance control section for controlling the value of the luminance control signal to be supplied to the display so as to set the luminance of the display to a level designated by the instructing section.

In response to data entry from the keyboard for instructing alteration of the luminance, this personal computer instructs the level of the display luminance according to the received data. A luminance altering section controls the value of the luminance control signal to be supplied to the display, adjusting the display luminance to the level designated by the instructing section. Since the personal computer can control its display luminance with data entered from the keyboard, an operator operates only a predetermined keyboard entry and easily sets the display luminance to the desired value.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 5 is a sub-conversion table illustrating the relation between remaining capacity of battery and supplied current, to be referred to by the power supply shown in FIG. 2;

DETAILED DESCRIPTION OF THE PREFERRED EMBODIMENTS

Figure 1:
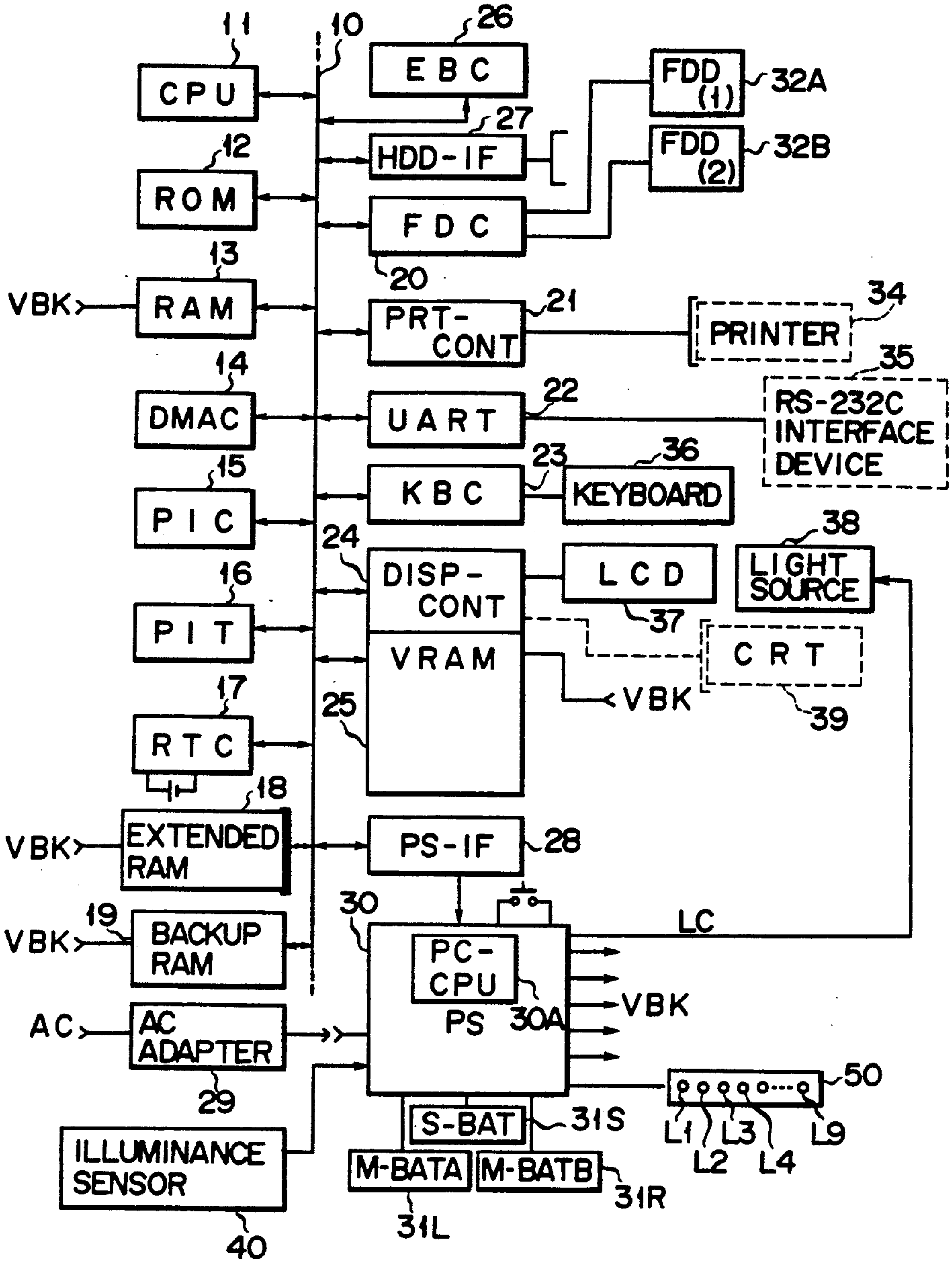
FIG. 1 is a block diagram illustrating the general system structure of a laptop personal computer according to one embodiment of the present invention.

A laptop personal computer of one embodiment of the present invention will now be described referring to FIG. 1. The laptop personal computer includes a system bus 10, a CPU 11, a ROM 12, a RAM 13, a direct memory access controller (MAC) 14, a programmable interrupt controller (PIC) 15, a programmable interval timer (PIT) 16, and a real time clock (RTC) 17, all connected to the system bus 10.

The CPU 11 executes various data processes, and issues a luminance designating command for instructing the luminance of a liquid crystal display (LCD) 37. The luminance designating command is issued in response to predetermined data entry from a keyboard 36.

The ROM 12 stores a fixed program necessary for the CPU 11 to access various data, and a luminance control program with which the CPU 11 issues a luminance designating command. The RAM 13 stores a program, data, etc. to be processed. The RAM 13 has a memory of, for example, 1.5 MB; 640 KB out of it is used for the main memory and the remaining 896 KB serves as a so-called hard RAM. The power is always supplied to this memory area, the hard RAM, by a backup power supply (VBK) even when the power is off.

The DMAC 14 controls directly a memory access. The PIC 15 controls an interrupt in accordance with a program. The RTC 17 is a clock module having its own battery for use.

The system bus 10 is connected further to an extended RAM 18, a backup RAM 19, a floppy disk controller (FDC) 20, a printer controller (PRT-CONT) 21, an universal asynchronous receiver/transmitter (UART) 22, a keyboard controller (KBC) 23, a display controller (DISP-CONT) 24, a video RAM (VRAM) 25, an extension bus connector (EBC) 26, and a hard disk interface (HDD-IF) 27.

The extended RAM 18 is an IC memory card whose memory is, for example, 1 MB or 2 MB. The backup RAM 19 has a data saving area for realizing a resume function, and is always provided with the backup power supply. The FDC 20 controls data-input/output with respect to two floppy disk drives 32A and 32B. The printer controller 21 controls a printer 34. The universal asynchronous receiver/transmitter 22 serves as an input/output interface, and is connected to an RS-232C interface device 35 as needed. The keyboard controller 23 controls key-entry from a keyboard 36 which is built in the personal computer.

Under the control of the CPU 11, the display controller 24 controls the display function of a liquid crystal display (LCD) 37 and, as needed, a CRT display (CRT) 39 to be externally connected through a connector. The liquid crystal display 37 is provided on the computer body to swing between its closed position and open position. The liquid crystal display 37 is constituted by a transparent liquid crystal panel, and has a light source 38 as an auxiliary light. The light source 38 is constituted by a plane luminophor such as an electroluminescence panel which irradiates the panel of the liquid crystal display 37 from the back, or a fluorescent tube which irradiates the liquid crystal panel from the side. The display luminance of the liquid crystal display 37 is adjusted in accordance with a light quantity irradiated from the light source 38, i.e., the volume of a current to drive the light source 38.

The video RAM 25 is designed to store data to be displayed on the liquid crystal display 37 or the CRT display 39 and to prevent loss of display data with the backup power supply. A hard disk unit and other components are connected to the extension bus connector 26 when necessary. A hard disk unit is connected to the hard disk interface 41.

A power control interface (PS-IF) 28, connected to the system bus 10, connects a power circuit (hereafter referred to as "intelligent power supply") 30 to the CPU 11 via the system bus 10. The intelligent power supply 30 has a power control CPU (PC-CPU) 30A, which controls to supply the power to ever unit of the computer. The intelligent power supply 30 is connected to two main batteries (M-BATA and M-BATB) 31L and 31R, which are pack-type, detachable and are constituted by chargeable batteries (Ni-Cd), and a built-in sub battery (S-BATT) 31S which is constituted by a chargeable battery (Ni-Cd). Further, the commercial AC power can be supplied to the intelligent power supply 30 through an AC adaptor 29.

The intelligent power supply 30 sends a luminance control signal LC as a current to the light source 38 to drive it. As the value of the luminance control signal LC, i.e., the current amount to be supplied to the light source 38 becomes greater, the light source 38 emits more light so as to raise the luminance on the liquid crystal display 37. On the contrary, when the value of the luminance control signal LC or the current to be supplied to the light source 38 is reduced, the light-emitting quantity from the light source 38 is decreased, so as to drop the luminance of the liquid crystal display 37. The value of the luminance control signal LC is determined by the luminance designating command from the CPU 11.

The intelligent power supply 30 serves to detect a remaining capacity of the battery 31L, and, when the remaining capacity of the battery 31L falls to a predetermined value or lower (hereafter referred to as "low battery status"), serves to turn on an LED 50 and decrease the value of luminance control signal LC in accordance to the remaining battery capacity to save the life of the battery 31L.

The value of the luminance control signal LC can be controlled using the output of an illuminance sensor 40, which is provided on the surface of the panel of the liquid crystal display 37. The illuminance sensor 40 detects illuminance of the surface of the panel of the liquid crystal display 37 by externally irradiating light, and generates a detect signal in theoretically "0" level when the detected illuminance is a given illuminance limit or below. The generation of such a signal from the illuminance sensor 40 means that the personal computer is being used in a dark environment. If the intelligent power supply 30 increases the value of the luminance control signal LC under these circumstances, the luminance of the liquid crystal display 37 rises. Accordingly, the screen of the liquid crystal display 37 is easier to see.

Figure 2:
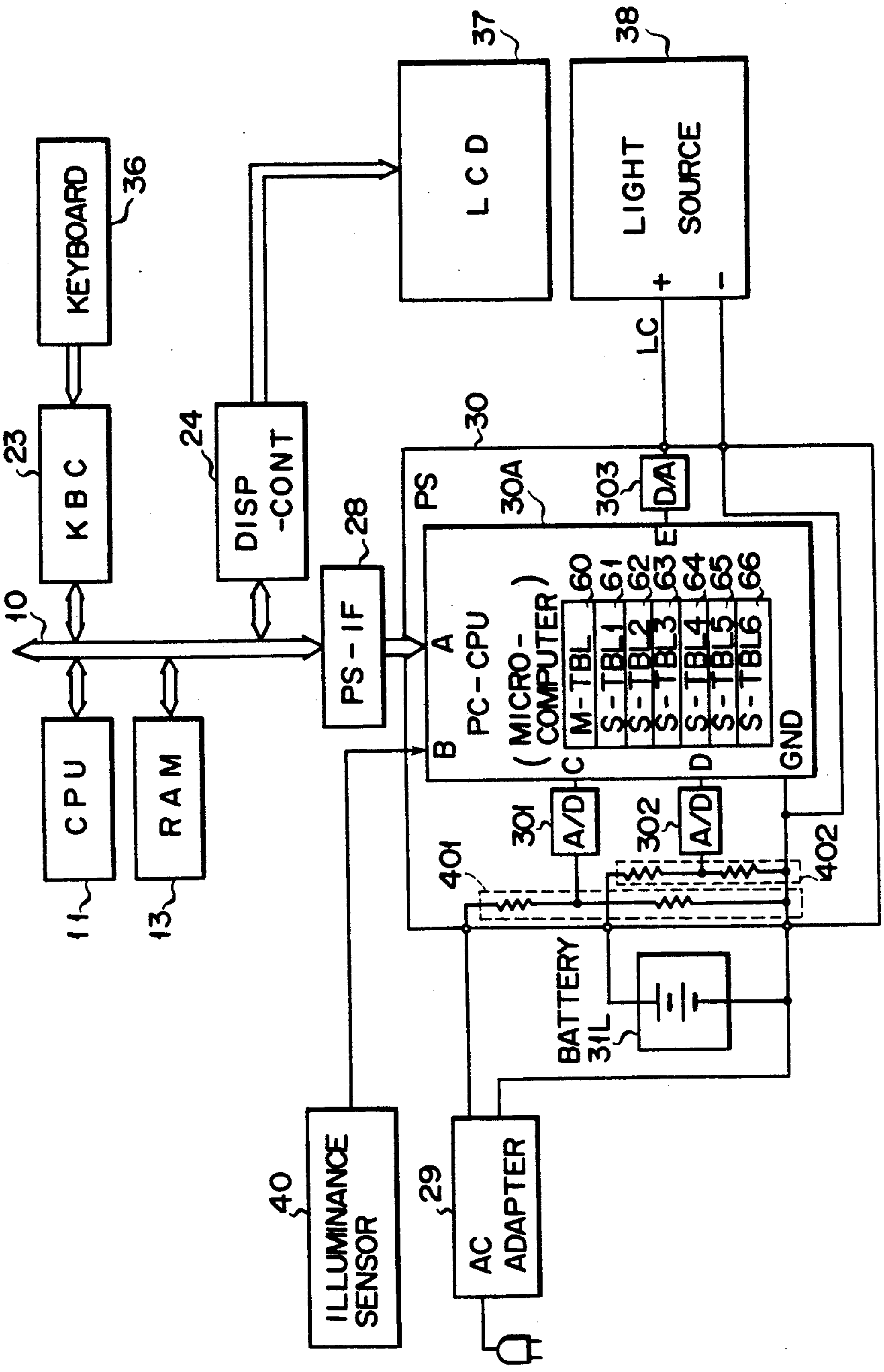
FIG. 2 is a block diagram exemplifying the structure of a power supply for controlling a display of the laptop personal computer shown in FIG. 1.

FIG. 2 illustrates the essential part of the personal computer shown in FIG. 1, i.e., an extracted part which concerns the liquid crystal display 37 and the control of the display luminance thereof.

The PC-CPU 30A of the intelligent power supply 30, constituted by a microcomputer, includes a main conversion table (M-TBL) 60 and sub-conversion tables (S-TBL1 to S-TBL6) 61 to 66. These conversion tables are stored in a ROM (not shown) in the microcomputer.

The main conversion table 60 defines luminance levels, which are designated by a luminance designating command from the CPU 11, and corresponding current levels to be supplied to the light source 38. When the battery 31L is not in the low battery status, the PC-CPU 30A reads, from the main conversion table 60, a current level corresponding to a luminance level designated by a luminance designating command, and determines the value of the signal LC. The content of the main conversion table 60 will be described later, referring to FIGS. 3 and 4.

The sub-conversion tables 61 to 66 show definitions of the remaining power of the battery 31L and the corresponding current level to be supplied to the light source 38. The current level therefore varies according to the remaining battery capacity to last the battery 31L longer.

The sub-conversion tables 61 to 66 differ from one another in characteristics for converting the remaining battery capacity into the level of a current to be supplied. With the battery 31L in the low battery status, the PC-CPU 30A refers to one of the sub conversion tables 61 to 66 to determine the level of a current to be supplied. At this time, the luminance designating command from the CPU 11 selects a sub-conversion table to be used. The content of the sub-conversion tables 61 to 66 will be described later in detail, referring to FIGS. 5 and 6.

The PC-CPU 30A includes I/O ports A, B, C and D to receive data necessary for controlling the value of the luminance control signal LC.

The I/O port A is connected via the power control interface 28 to the system bus 10, and receives a luminance designating command from the CPU 11. The I/O port B receives a detect signal to be sent from the illuminance sensor 40. The I/O port C is connected via an A/D converter 301 and a voltage-dividing circuit 401 to the positive voltage output terminal of the AC adaptor 29. Digital data received to the I/O port C is read by the PC-CPU 30A, and is used as information for discriminating whether or not the AC adaptor 29 is connected to the intelligent power supply 30. The I/O port D is connected via an A/D converter 302 and a voltage-dividing circuit 402 to the positive voltage output terminal of the battery 31L. Digital data sent to the I/O port D is read by the PC-CPU 30A to serve as information for detecting the remaining capacity of the battery 31L.

The PC-CPU 30A further has an I/O port E for sending a digital luminance control signal. The digital signal from the I/O port E is converted by a D/A converter 303 into an analog signal, which is in turn supplied as the luminance control signal LC to the light source 38.

The concrete example of the main conversion table 60 and its conversion characteristic from the luminance level into the level of the current to be supplied will now be explained referring to FIGS. 3 and 4.

Figures 3, 4:
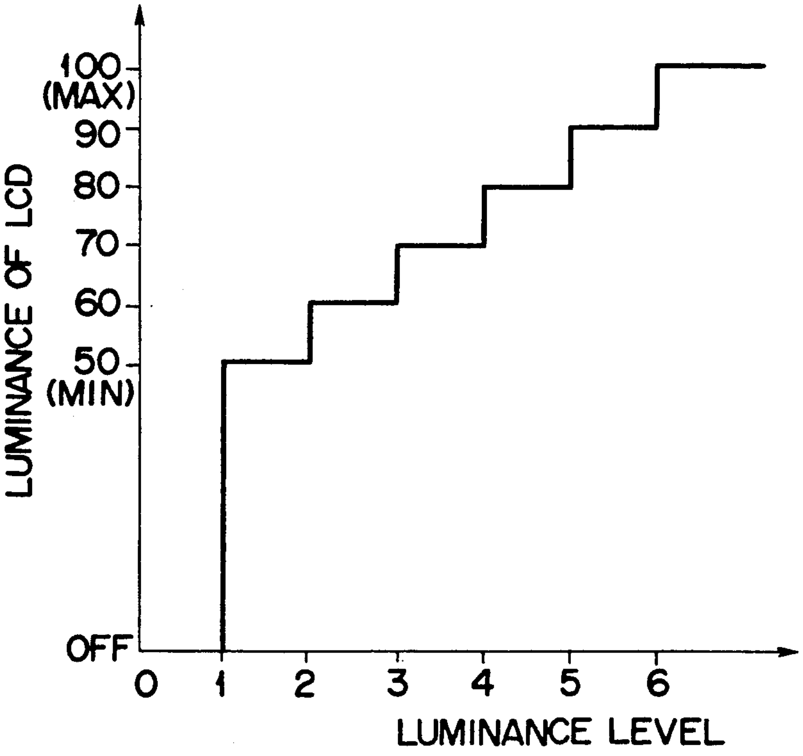
FIG. 3 is a main conversion table illustrating the relation between a luminance level and a supplied current level, to be referred to by the power supply shown in FIG. 2.
FIG. 4 is a graph representing a characteristic of converting the value of the luminance into that of the supplied current according to the main conversion table shown in FIG. 3.

As shown in FIG. 3, the main conversion table 60 represents seven different luminance levels ("0" to "6"), and defines different current levels to be supplied, which correspond to the respective luminance levels. In this example, current levels "0" to "100" correspond respectively to luminance levels "0" to "6." Current level "0" means no power supply to the light source 38, which is then set to OFF. Current level "100" means that the maximum current is supplied to the light source 38 within the performance range of the intelligent power supply 30. The light source 30 emits the maximum amount of light, so that the luminance of the liquid crystal display 37 reaches to the maximum (MAX).

Using the main conversion table 60 in FIG. 3, therefore, the luminance of the liquid crystal display 37 varies step by step according to the luminance level to be designated by the luminance designating command.

When the luminance level "0" is selected by the luminance designating command, the liquid crystal display 37 is in the OFF status. When any of the luminance levels "1" to "6" is selected, the liquid crystal display 37 is turned on. In the ON status, the luminance of the liquid crystal display 37 is minimum (MIN) when the luminance level "1" is selected, then sequentially rises as the luminance level is changed to "2," "3," "4," . . . and finally reaches the maximum when the luminance level "6" is selected. The luminance level "3" is a standard level among "0" to "6". When the power is turned on, the CPU 11 issues a luminance designating command for designating the standard luminance level "3". In accordance with the command, the PC-CPU 30A sets the luminance of the liquid crystal display 37 corresponding to the level "3".

The concrete examples of the sub-conversion tables 61 to 66 and their characteristics in converting the remaining capacity of the battery into the current level to be supply will now be explained, referring to FIGS. 5 and 6.

As shown in FIG. 5, the sub conversion tables 61 to 66 correspond respectively to the luminance levels "1" to "6" which are defined in the main conversion table 60. Each of the sub conversion tables 61 to 66 defines the relation between the remaining capacity of the battery 31L and the level of the current to be supplied to the light source 38.

In the sub-conversion table 63 corresponding to the standard luminance level "3", the level for the current supply to the light source 38 is to drop in accordance with the decrease of the remaining capacity of the battery 31L to last the battery 31L as long as possible. In other words, according to the sub-conversion table 63, the current levels "70," "50," "30" and "10" correspond to the respective remaining capacity of the battery 31L, "40", "30", "20" and "10". The remaining capacity "40" means that the power of the battery 31L is reduced down to 40% of the full charge, and the battery 31L is in the low battery status this time.

In the other sub-conversion tables 61, 62, 64, 65 and 66, unlike in the sub-conversion table 63, the level of the current to be supplied to the light source 38 does not decrease in proportion to the reduction of the remaining capacity of the battery 31L. The current to be supplied constantly holds a given level until the remaining capacity of the battery 31L is about to drop to 10%, and then decreases in proportion to reduction of the power of the battery 31L. Such a given level of the current differs for every sub-conversion table. The given level is specified to be level "50" is rated for the sub-conversion table 61 corresponding to luminance level "1", "60" for the table 62 corresponding to the luminance level "2", "80" for the table 64 corresponding to the luminance level "4", "90" for the table 65 of the luminance level "5", and "100" for the table 66 of the luminance level "6".

As described above, the sub-conversion tables 61 to 66 have different characteristics for converting the remaining capacity of the battery into the level of the current to be supplied. Even in the low battery status, therefore, the luminance of the liquid crystal display 37 varies depending on which sub-conversion table is selected by the luminance designating command from CPU 22.

Figure 6:
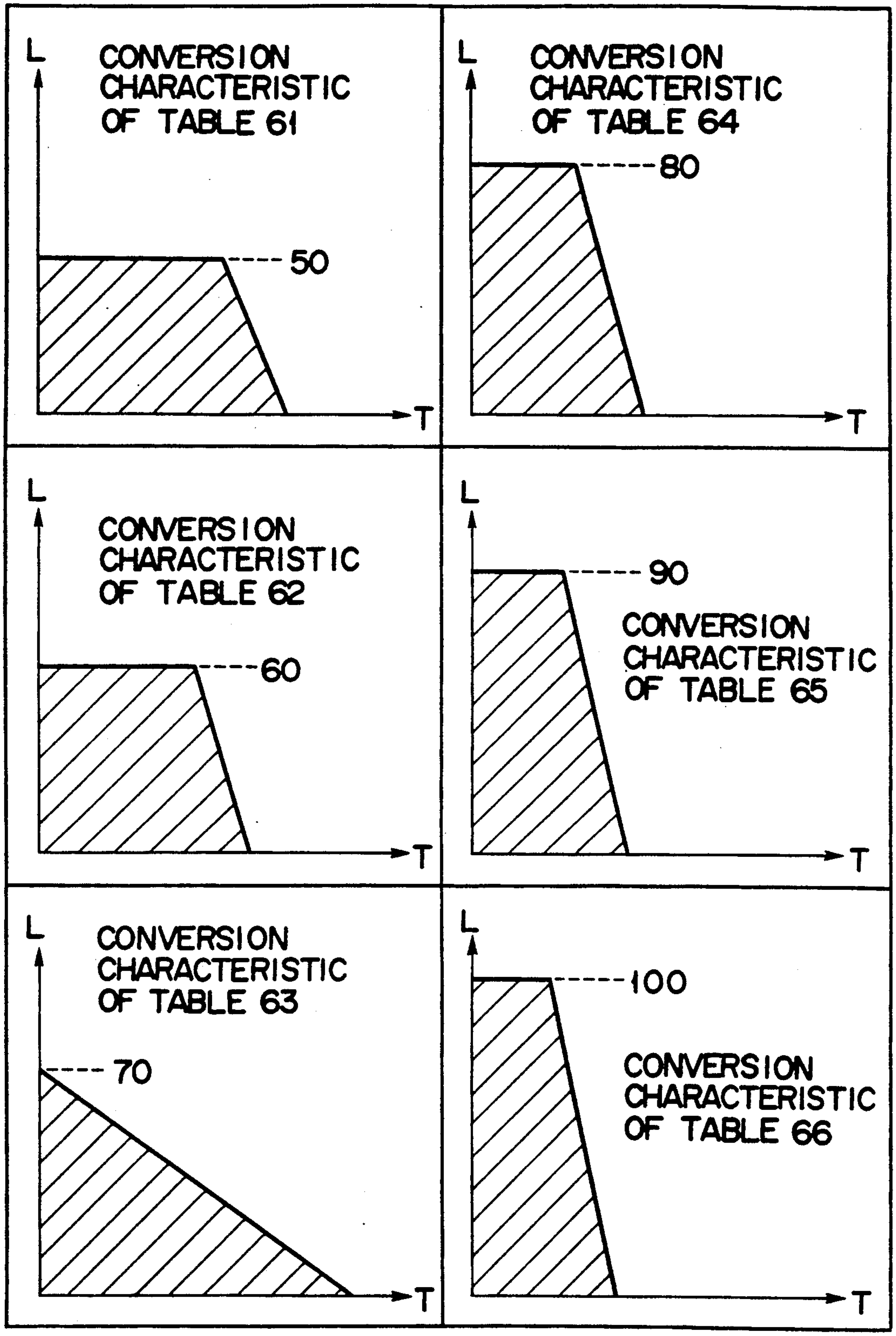
FIG. 6 shows graphs representing characteristics when the value of the remaining capacity of battery is converted into the supplied current value according to the sub-conversion table shown in FIG. 5.

FIG. 6 illustrates the relation between the time (T) elapsing after the the battery 31L becomes the low battery status and the luminance (L) of the liquid crystal display 37 for the individual sub-conversion table 61 to 66. Every shadowed area in FIG. 6 corresponds to the remaining capacity of the battery 31L in the low battery status.

As apparent from FIG. 6, the luminance of the liquid crystal display 37 becomes maximum when the sub-conversion table 66 is used, while it becomes minimum with the sub-conversion table 61 used. In the case of using the sub-conversion table 63, the luminance of the liquid crystal display 37 is gradually decreased as the time elapses. The service life of the battery 31L lasts longest when the sub-conversion table 63 is used, and shortest with the sub-conversion table 66 used.

The operation of the CPU 11 on issuing the luminance designating command will now be described, referring to a flowchart in FIG. 7.

With the power switch of the personal computer turned ON, the CPU 11 reads a program from the ROM 12 to store it in the RAM 13. The CPU 11 executes this program, initializing ever unit of the personal computer. In this process, the CPU 11 issues the luminance designating command for selecting the standard luminance level "3", and stores the level "3" as the present luminance level of the liquid crystal display 37 into the RAM 13. The PC-CPU 30A of the intelligent power supply 30 sets the liquid crystal display 37 to the luminance corresponding to the standard luminance level "3" in accordance with the luminance designating command which designates the standard luminance level "3".

After the initialization process is completed, an operator checks the present brightness (luminance corresponding to the standard luminance level "3") on the screen of the liquid crystal display 37, and determines whether or not the luminance of the liquid crystal display 37 should be altered (raised or reduced). To drop the display luminance, the operator presses a downward arrow key " ↓ "of the keyboard 36 with depressing a control key (CTRL) and an alternate key (ALT) (CTRL+ALT+ ↓ ).

To increase the display luminance, the operator presses an upward arrow key " ↑ "while depressing the control key and the alternate key (CTRL+ALT+ ↑ ) together.

Figure 7:
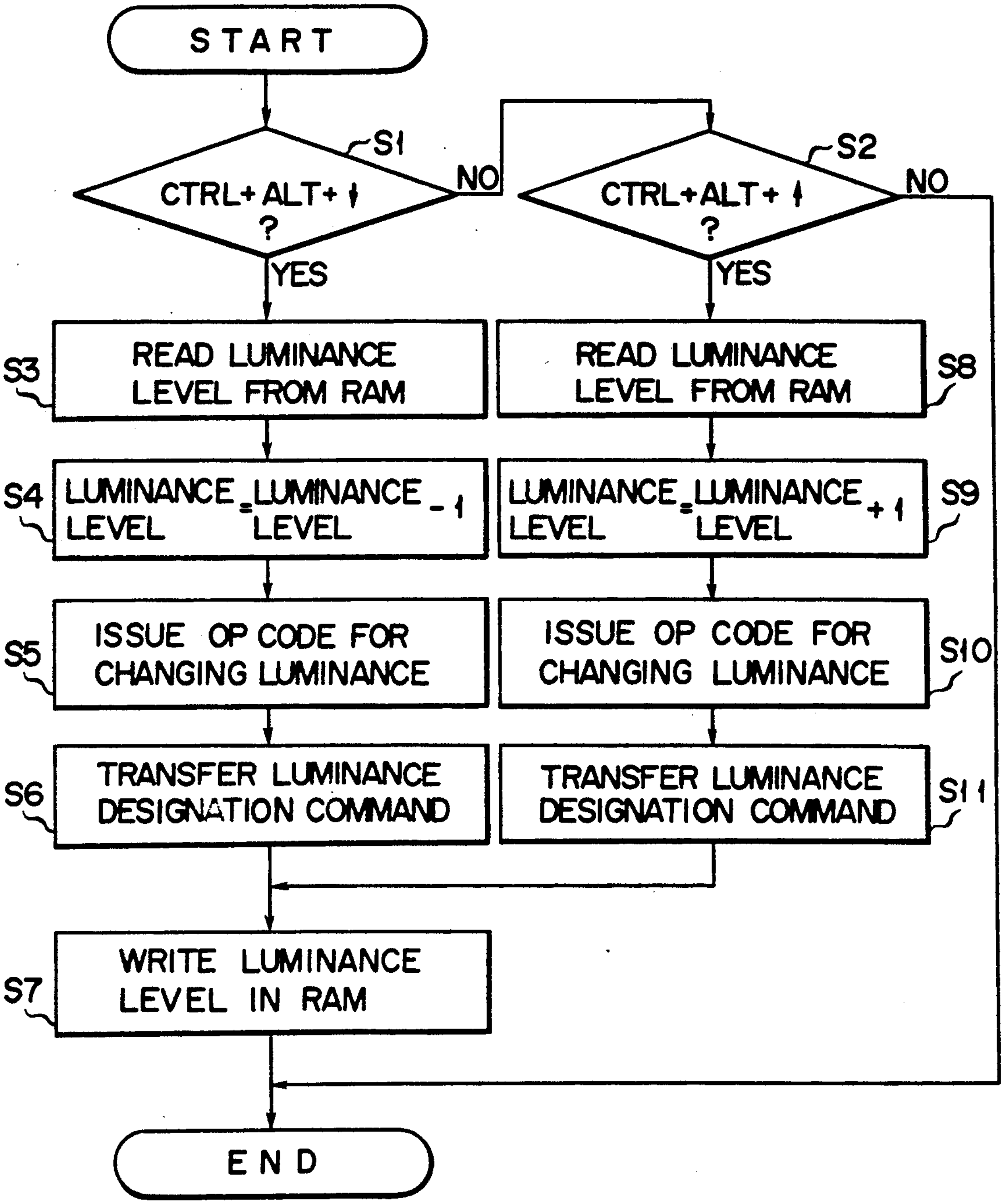
FIG. 7 is a flowchart showing the issuance of luminance designating commands to be executed by a CPU in the laptop personal computer shown in FIG. 1.

Upon reception of the key entry (CTRL+ALT+ ↓ ), or the key entry (CTRL+ALT+ ↑ ), the CPU 11 executes the routine shown in FIG. 7.

Based on a received key entry code, the CPU 11 determines which key entry has been executed, (CTRL+ALT+ ↑ ) or (CTRL+ALT+ ↑ ) (steps S1 and S2).

When (CTRL+ALT+ ↓ ) has been executed, the CPU 11 reads the present luminance level of the liquid crystal display 37 from the RAM 13, and recognizes that the liquid crystal display 37 has been set to the standard luminance level "3" (step S3). The CPU 11 drops the read luminance level "3" by one so that the luminance of the liquid crystal display 37 is decremented by one in level (step S4). Then the CPU 11 issues an operation code for instructing alteration of the luminance level (step S5). The CPU 11 supplies the operation code and a new luminance level "2", to the PC-CPU 30A as a luminance designating command, and instructs the PC-CPU 30A to reduce the present luminance level (step S6). The CPU 11 then stores the new luminance level "2" into the RAM 13 to update the present luminance level "3" (step S7). A series of steps S1 to S7 is executed for every key entry of (CTRL+ALT+ ↓ ) by the operator. The luminance level to be selected by the luminance designating command therefore is reduced level by level each time the operator enters (CTRL+ALT+ ↓ ).

When (CTRL+ALT+ ↑ ) has been entered, the CPU 11 reads the present luminance level of the liquid crystal display 37 from the RAM 13, and recognizes that the liquid crystal display 37 is set to the standard luminance level "3" (step S8). The CPU 11 increments the read luminance level "3" by one to increase the luminance level of the liquid crystal display 37 by one (step S9). The CPU 11 then issues the operation code to instruct alteration of the luminance level (step S10). The CPU 11 supplies the operation code and a new luminance level "4" to the PC-CPU 30A as the luminance designating command, and instructs it to raise the luminance level (step S11). The CPU 11 stores the level "4" as the present luminance level of the liquid crystal display 37 into the RAM 13 (step S7). A series of steps S2 to S11 and S7 is executed for every key entry, (CTRL+ALT+ ↑ ), from the operator. The luminance level to be selected by the luminance designating command sequentially increases level by level every time the operator enters (CTRL+ALT+ ↑ ).

The operation of the PC-CPU 30A on the control of the luminance of the liquid crystal display 37 will now be described, referring to a flowchart in FIG. 8.

To begin with, the initializing operation of the PC-CPU 30A will be explained.

When the power switched of the personal computer is turned on, the PC-CPU 30A stores a luminance level (the standard luminance level "3"), which is designated by the luminance designating command for initialization supplied from the CPU 11, as the present luminance level into the internal RAM, and acknowledges that the standard luminance level "3" is now the present level (step S21). The PC-CPU 30A then determines whether or not a new luminance designating command is issued from the CPU 11 (step S22). When such a command has been issued, the present luminance level is altered to a level designated by the luminance designating command (step S23). Since no luminance designating command is normally issued in the initializing process immediately after the power is on, the standard luminance level "3" is held as the present luminance level. The PC-CPU 30A determines if the battery 31L is the low battery status (step S24).

When the battery 31L is not the low battery status, the PC-CPU 30A refers to the main conversion table 60 shown in FIG. 3 to select the level of the current to be supplied, corresponding to the present luminance level or the standard luminance level "3" (step S25). The level of the current to be supplied is "70" in this case. The PC-CPU 30A sends digital data corresponding to the current level "70" from the I/O port E (step S26). The digital data is converted by the D/A converter 303 into analog data, which is in turn supplied as the luminance control signal LC to the light source 38. The luminance of the liquid crystal display 37 is therefore set to a corresponding value to the standard luminance level "3", completing the initializing process.

After this process is over, when the CPU 11 issues a luminance designating command, the present luminance level is altered to a level designated by the luminance designating command (step S23). For example, in the case that an operator enters (CTRL+ALT+↓), the present luminance level or the standard luminance level "3" drops by one level to "2." The PC-CPU 30A selects the level of the to be supplied current, "60", corresponding to the luminance level "2", referring to the main conversion table 60, and outputs digital data corresponding to the current level "60" from the I/O port E. The digital data is converted into analog data by the D/A converter 303. The analog data is in turn supplied as the luminance control signal LC to the light source 38. As a result, the luminance of the liquid crystal display 37 is set to a value corresponding to the luminance level "2", one-level lower than the standard luminance level "3".

In the case that the operator further enters (CTRL+ALT+↓) under the above-described circumstances, the present luminance level drops by one level, from "2" to "1." The luminance of the liquid crystal display 37 is therefore set to a corresponding value to the luminance level "1".

If the operator enters (CTRL+ALT+↑), the PC-CPU 30A executes the operation as described above in accordance with the luminance designating command, thereby allowing the luminance of the liquid crystal display 37 to increase level by level.

With the luminance of the liquid crystal display 37 set to the value corresponding to the standard luminance level "3", entering (CTRL+ALT+↑) will increase the present luminance level by one level from the standard luminance level "3" to the level "4" in step S23. The PC-CPU 30A selects the level of the current to be supplied, "80", corresponding to the luminance level "4" referring to the main conversion table 60, and outputs digital data corresponding to the current level "80" from the I/O port E. The digital data is converted by the D/A converter 303 into analog data, which is in turn supplied as the luminance control signal LC to the light source 38. The luminance of the liquid crystal display 37 is set to a value corresponding to the luminance level "4", higher by one level than the standard luminance level "3".

Under the above-described circumstances, if the operator further enters (CTRL+ALT+↑), the present luminance level will increase by one level, from the level "4" to "5". Thus, the luminance of the liquid crystal display 37 is set to a value corresponding to the luminance level "5".

As described above, the luminance of the liquid crystal display 37 is altered level by level in accordance with a luminance designating command to be issue by the CPU 11.

When the PC-CPU 30A has detected in step S2 that the battery 31L is the low battery status, the PC-CPU 30A switches conversion tables to be used from the main conversion table 60 to one of the sub-conversion tables 61 to 66 in order to prolong the life of the battery 31L. The present luminance level stored in the internal RAM determines which of the sub-conversion tables 61 to 66 should be selected (step S27). That is, the present luminance levels "1" to "6" are associated with the sub-conversion tables 61 to 66, respectively, so that when the present luminance level is "1", the sub-conversion table 61 is selected, and so forth.

When the sub-conversion table 61 is selected, the PC-CPU 30A refers to that table 61 to select the level of the current to be supplied, which corresponds to the remaining capacity of the battery 31L. The PC-CPU 30A sends digital data corresponding to the current level from the I/O port E (steps S28-1 and S29). The digital data is converted by the D/A converter 303 into analog data which is then supplied as the luminance control signal LC to the light source 38. As described earlier referring to FIG. 6, the luminance of the liquid crystal display 37 is therefore kept at the level corresponding to the level of the current to be supplied, "50", in a given period of time, thereafter decreasing as the time elapses.

If another sub-conversion table is selected, the luminance of the liquid crystal display 37 is controlled in the manner as explained above, according to the characteristic of the selected sub-conversion table for converting the remaining capacity of the battery into the level of the current to be supplied.

In such a low-battery status, when the CPU 11 issues the luminance designating command, the PC-CPU 30A alters the value of the present luminance level specified by this command in step S23. For instance, if the present luminance level is the standard luminance level "3", when the operator performs the key operation of "(CTRL+ALT+↑)", the present luminance level is increased by one level from the standard luminance level "3" to the level "4". In this case, the PC-CPU 30A switches the sub-conversion table to be used from the table 63 to the table 64. As a result, the luminance of the liquid crystal display 37 is set higher than when the sub-conversion table 63 is used.

When the operator further makes the key entry "(CTRL+ALT+↑)" under the above circumstances, the present luminance level, "4", is changed to "5" one level higher than the present level. In this case, the luminance of the liquid crystal display 37 is controlled in accordance with the characteristic of the sub-conversion table 65 for converting the battery's remaining capacity into the level of the current to be supplied.

When the operator makes the key entry "(CTRL+ALT+↓)" in low-battery status, the PC-CPU 30*a* selects the proper sub-conversion table according to the luminance designating command to thereby drop the luminance of the liquid crystal display 37.

In the above manner, the luminance of the liquid crystal display 37 is altered level by level in accordance with the key operation made by the operator, or the luminance designating command from the CPU 11 even if the battery 31L is in low-battery status.

The operator can therefore easily set the luminance of the liquid crystal display 37 to the desired value by performing a predetermined key operation irrespective of whether or not the battery 31L is in low-battery status.

Figure 8:
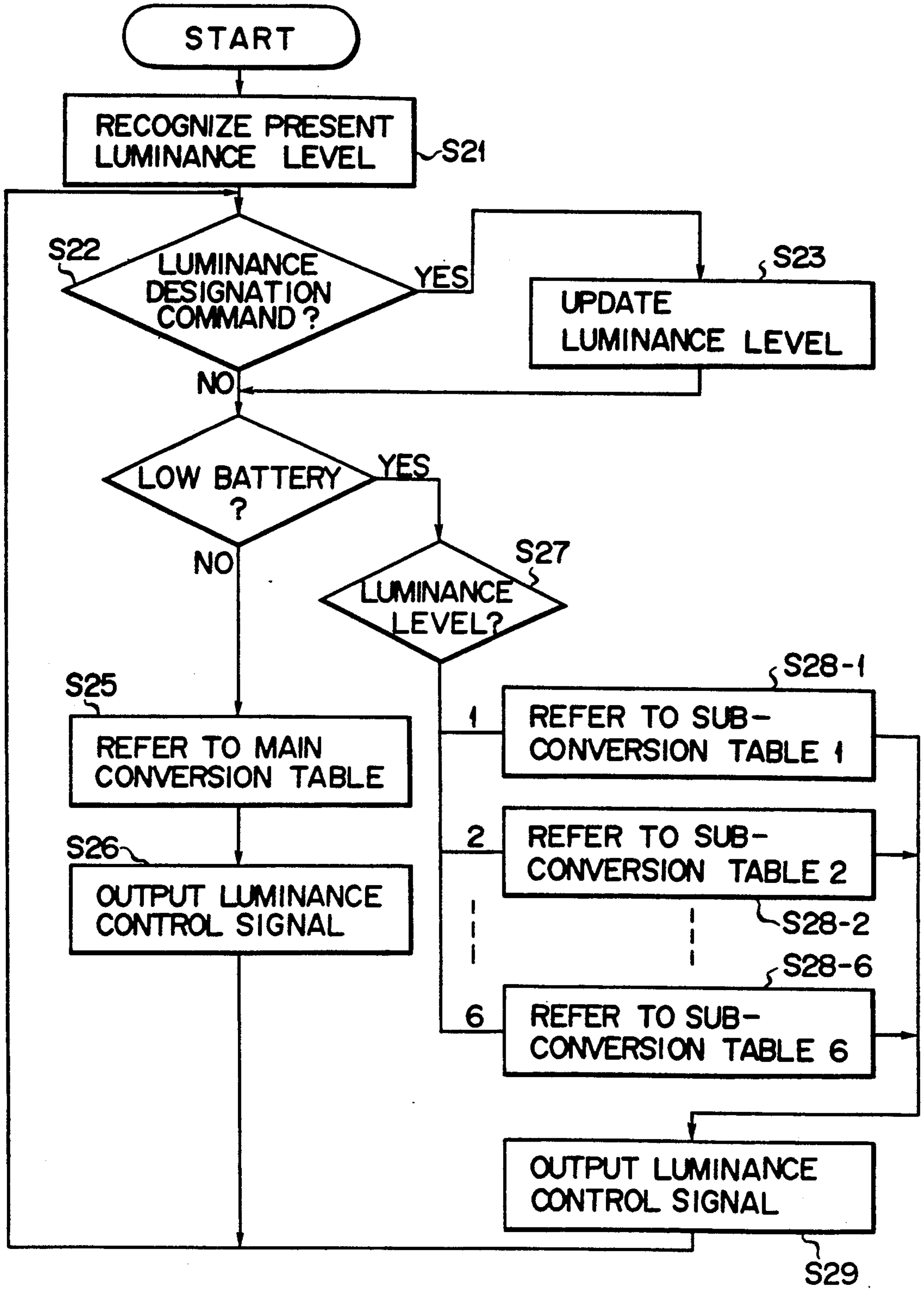
FIG. 8 is a flowchart illustrating a process of altering the display luminance which is to be executed by the power supply shown in FIG. 2.

While the description referring to the flowchart in FIG. 8 has been given with reference to the case where the luminance of the liquid crystal display 37 is controlled in accordance with the content of the luminance designating command and the value of the remaining capacity of the battery 31L, the detection signal from the illuminance sensor 40 may additionally be used for the luminance control.

In this case, it is preferable that the luminance of the liquid crystal display 37 is increased by one level when the detection signal indicating logical "0" level is output from the sensor 40. This way can automatically adjust the luminance of the display 37 in accordance with the ambient brightness.

Further, while in this embodiment the routine for issuing the luminance designating command from the CPU 11, as illustrated in FIG. 7, is invoked upon data entry from the keyboard 36, this routine may be invoked by an application program stored in, for example, the floppy disk drive 32A. In this case, if the application program is designed to be able to instruct the amount of an increase or a decrease in luminance level in accordance with the type of its data processing, the proper display luminance can automatically be selected for each type of data processing, thus enhancing the display effect.

Figure 9:
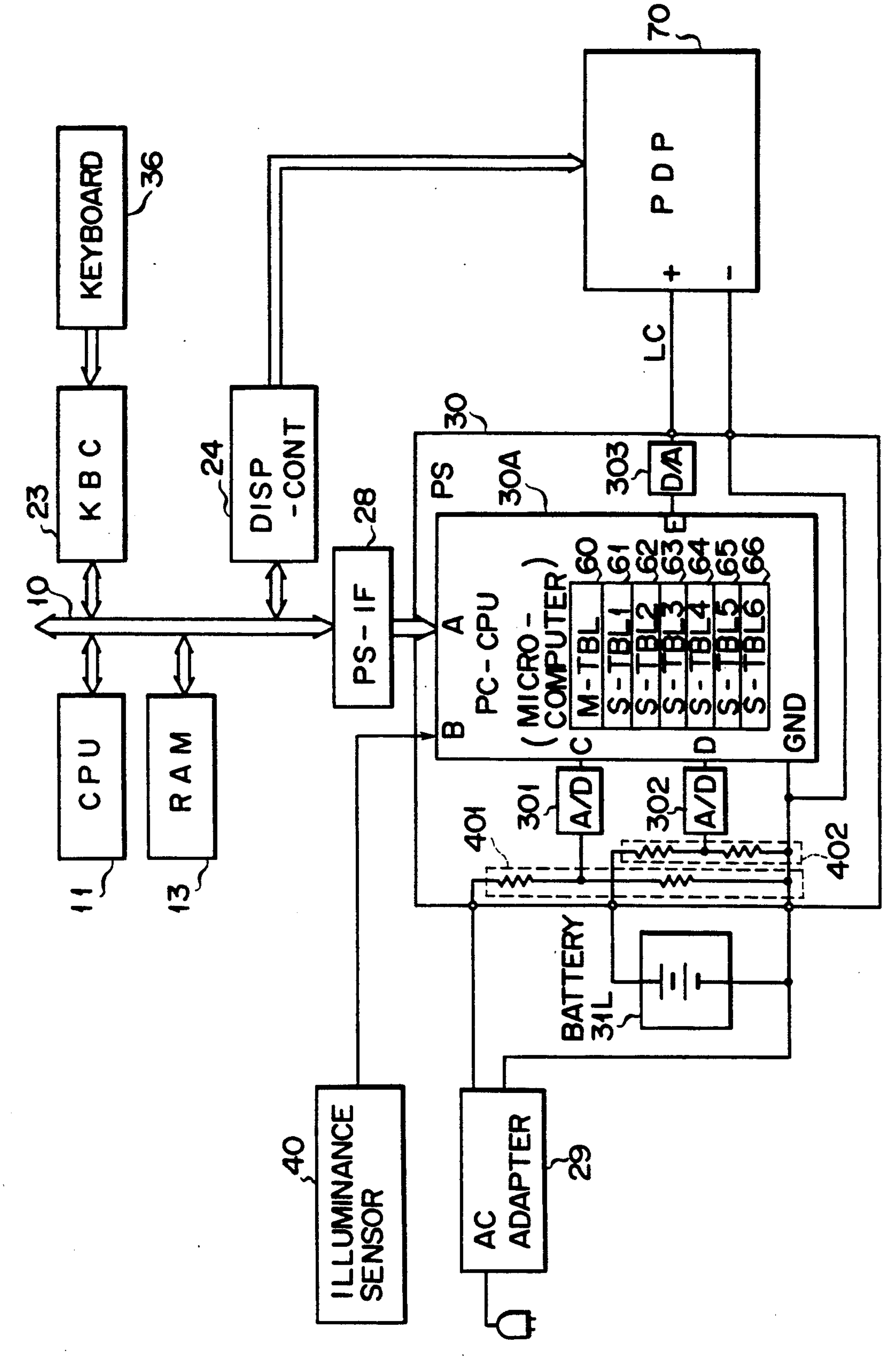
FIG. 9 is a diagram illustrating a modification of the display provided in the laptop personal computer shown in FIG. 1.

While the liquid crystal display 37 is used as a display section in this embodiment, the display section is not limited to this particular type, but a plasma display panel (PDP) 70 may also be used as shown in FIG. 9.

In this case, the luminance of the plasma display panel 70 varies in accordance with the amount of discharge in the panel. In this respect, the luminance control signal from the intelligent power supply 30 has only to be input directly to the plasma display panel, not to the light source 38.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A battery operable personal computer comprising:
   a display for displaying various types of data at a luminance level according to a value of a luminance control signal;
   a keyboard for entering data instructing alteration of said luminance level of said display;
   instructing means for instructing said luminance level of said display in accordance with data entered through said keyboard; and
   luminance control means for controlling said vale of said luminance control signal to be supplied to said display in such a way that said luminance level of said display becomes one specified by said instructing means, said luminance control means including table means having multiple luminance levels and values of multiple luminance control signals corresponding to said multiple luminance levels defined therein and means for referring to said table means to acquire the value of that luminance control signal corresponding to said luminance level specified by said instructing means.

2. A personal computer according to claim 1, wherein said keyboard serves to enter first data and second data respectively instructing an increase and a decrease in luminance level of said display, in accordance with a key operation.

3. A personal computer according to claim 2, wherein said instructing means includes:
   means for instructing one of said multiple luminance levels defined in said table means;
   means for changing a target luminance level to be instructed to a level higher by one than said instructed luminance level in response to said first data from said keyboard; and
   means for changing said target luminance level to be instructed to a level lower by one than said instructed luminance level in response to said second data from said keyboard.

4. A personal computer according to claim 2, wherein said instructing means includes:
   means for instructing one of said multiple luminance levels defined in said table means as a standard luminance level;
   means for sequentially increasing a target luminance level to be instructed level by level from said standard luminance level upon each reception of said first data from said keyboard; and
   means for sequentially decreasing said target luminance level to be instructed level by level from said standard luminance level upon each reception of said second data from said keyboard.

5. A battery operable personal computer comprising:
   a display for displaying various types of data at a luminance level according to a value of a luminance control signal;
   a keyboard for entering first data and second data respectively instructing an increase and a decrease in luminance level of said display;
   instructing means for instructing said luminance level of said display in such a manner as to set said luminance level of said display to a standard luminance level in initialization mode, and to sequentially increase a target luminance level to be instructed level by level from said standard luminance level upon each reception of said first data from said keyboard, and sequentially decrease said target luminance level to be instructed level by level from said standard luminance level upon each reception of said second data from said keyboard in data processing mode in which data entered through said keyboard is accepted; and
   luminance control means for controlling said value of said luminance control signal to be supplied to said display in such a way that said luminance level of said display becomes one specified by said instructing means, said luminance control means includes table means having multiple luminance levels and values of multiple luminance control signals corresponding to said multiple luminance levels defined therein and means for referring to said table means to acquire the value of that luminance control signal corresponding to said luminance level specified by said instructing means.

6. A personal computer according to claim 5, further comprising battery power detecting means for detecting remaining capacity of said battery.

7. A battery operable personal computer comprising:
   a display for displaying various types of data at a luminance level according to a value of a luminance control signal;
   a keyboard for entering data instructing alteration of said luminance level of said display;

instructing means for instructing said luminance level of said display in accordance with data entered through said keyboard;

battery power detecting means for detecting remaining capacity of said battery; and luminance control means for controlling said value of said luminance control signal to be supplied to said display in such a way that said luminance level of said display becomes one specified by said instructing means, said luminance control means including:

first table means having multiple luminance levels and values of multiple luminance control signals corresponding to said multiple luminance levels defined therein;

second table means having multiple pieces of power data indicating remaining capacity of said battery and values of multiple luminance control signals corresponding to said multiple pieces of power data;

means for selecting one of said first and second table means in accordance with whether or not remaining capacity of said battery detected by said battery power detecting means is equal to or below a predetermined value;

means for referring to said first table means when said first table means is selected to thereby acquire the value of that luminance control signal corresponding to said luminance level specified by said instructing means; and means for referring to said second table means when said second table means is selected to thereby acquire the value of that luminance control signal corresponding to said remaining capacity of said battery detected by said battery power detecting means.

8. A personal computer according to claim 7, wherein said second table means includes multiple second tables to which said multiple luminance levels defined in said first table means are respectively assigned and each of which has multiple pieces of power data indicating remaining capacity of said battery and values of multiple luminance control signals corresponding to said multiple pieces of power data defined therein; and when said second table means is selected, said luminance control means selects one of said multiple second tables to which said luminance level specified by said instructing means is assigned, and refers to said selected second table to acquire the value of said luminance level corresponding to said remaining capacity of said battery detected by said battery power detecting means.

9. A battery operable personal computer comprising:

a display for displaying various types of data at a luminance level according to a value of a luminance control signal;

a keyboard for entering first data and second data respectively instructing an increase and a decrease in luminance level of said display;

battery power detecting means for detecting remaining capacity of said battery;

instructing means for instructing said luminance level of said display in such a manner as to set said luminance level of said display to a standard luminance level in initialization mode, and to sequentially increase a target luminance level to be instructed level by level from said standard luminance level upon each reception of said first data from said keyboard, and sequentially decrease said target luminance level to be instructed level by level from said standard luminance level upon each reception of said second data from said keyboard in data processing mode in which data entered through said keyboard is accepted; and luminance control means for controlling said value of said luminance control signal to be supplied to said display in such a way that said luminance level of said display becomes one specified by said instructing means, said luminance control means including:

first table means having multiple luminance levels and values of multiple luminance control signals corresponding to said multiple luminance levels defined therein;

second table means having multiple pieces of power data indicating remaining capacity of said battery and values of multiple luminance control signals corresponding to said multiple pieces of power data;

means for selecting one of said first and second table means in accordance with whether or not remaining capacity of said battery detected by said batter power detecting means is equal to or below a predetermined value;

means for referring to said first table means when said first table means is selected to thereby acquire the value of that luminance control signal corresponding to said luminance level specified by said instructing means; and means for referring to said second tale means when said second table means is selected to thereby acquire the value of that luminance control signal corresponding to said remaining capacity of said battery detected by said battery power detecting means.

10. A personal computer according to claim 9, wherein said second table means includes multiple second tables to which said multiple luminance levels defined in said first table means are respectively assigned and each of which has multiple pieces of power data indicating remaining capacity of said battery and values of multiple luminance control signals corresponding to said multiple pieces of power data defined therein; and when said second table means is selected, said luminance control means selects one of said multiple second tables to which said luminance level specified by said instructing means is assigned, and refers to said selected second table to acquire the value of said luminance level corresponding to said remaining power of said battery detected by said battery power detecting means.

* * * * *

UNITED STATES PATENT AND TRADEMARK OFFICE

CERTIFICATE OF CORRECTION

PATENT NO. : 5,315,695
DATED : May 24, 1994
INVENTOR(S) : Toshimitsu Saito, et al.

It is certified that error appears in the above-indentified patent and that said Letters Patent is hereby corrected as shown below:

Claim 1, Column 11, Line 54, change "vale" to --value--.

Claim 9, Column 14, Line 31, change "batter" to --battery--.

Claim 9, Column 14, Line 38, change "tale" to --table--.

Signed and Sealed this

Twenty-first Day of March, 1995

Attest:

BRUCE LEHMAN

*Attesting Officer* *Commissioner of Patents and Trademarks*